Sept. 7, 1943.　　　　　S. MAYER　　　　　2,328,915
FISHING ACCESSORY
Filed June 6, 1941　　　　2 Sheets-Sheet 1
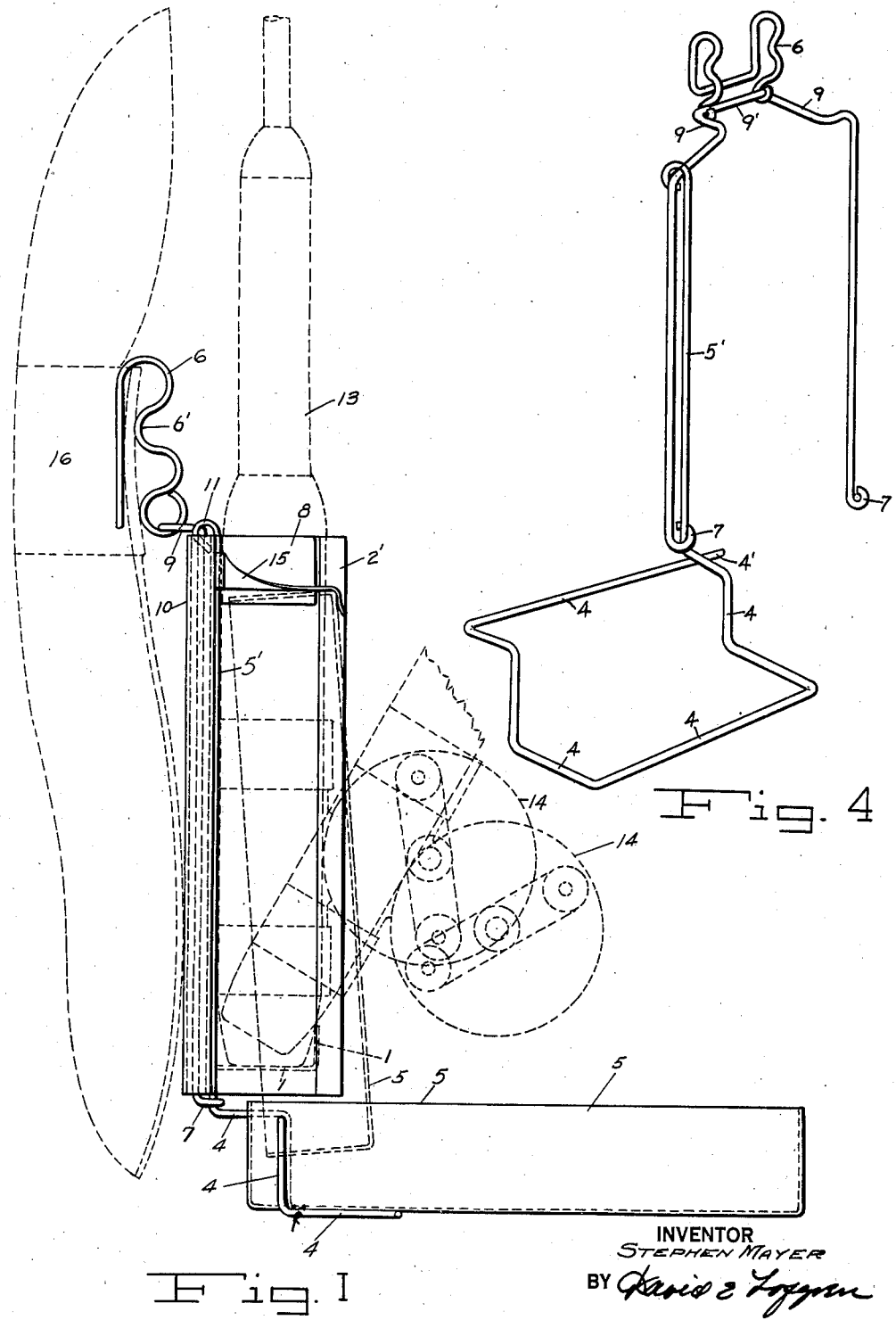
INVENTOR
STEPHEN MAYER
BY *[signature]*
ATTORNEY

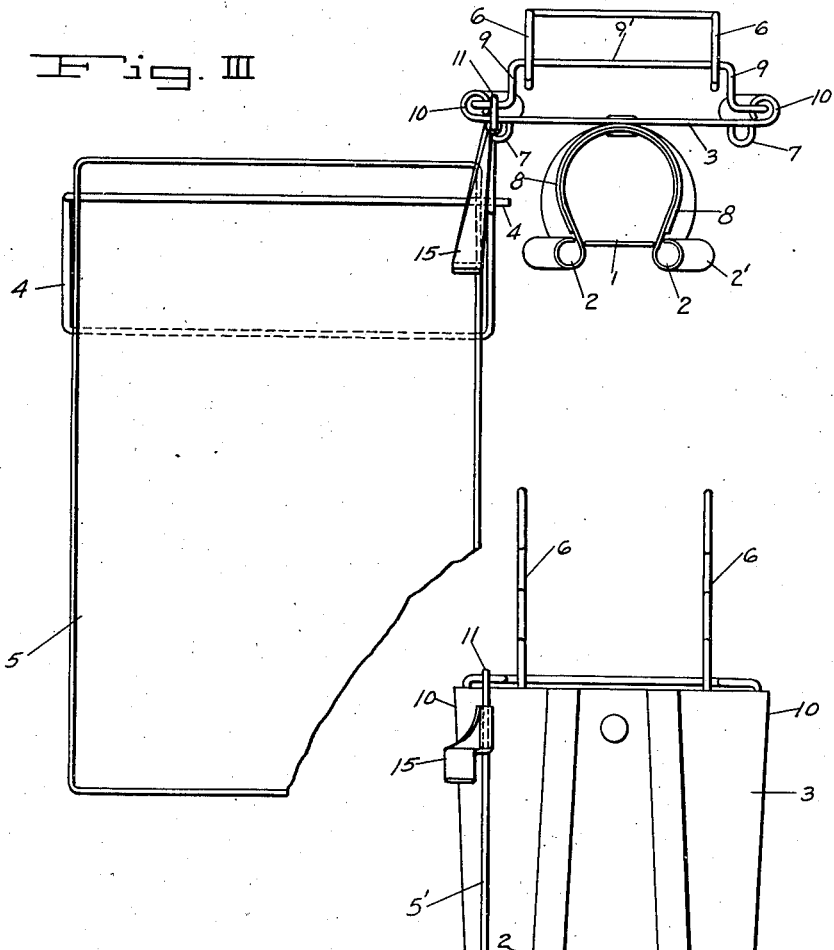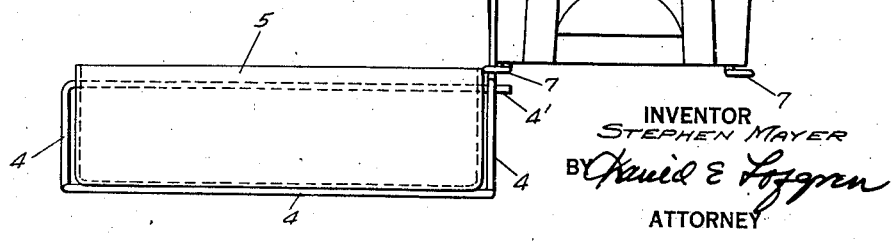

Patented Sept. 7, 1943

2,328,915

UNITED STATES PATENT OFFICE 2,328,915

FISHING ACCESSORY

Stephen Mayer, Portland, Oreg.

Application June 6, 1941, Serial No. 396,849

3 Claims. (Cl. 224—5)

This invention is directed to an improvement in fishing accessories, and more particularly to a support for fishing poles, wherein the pole may be secured in an upright position, or in any angular position, or conveniently removed from the support at will.

The primary object of the present invention is the provision of a fishing pole support constructed to receive and clamp the fishing pole in an upright position to permit the fisherman to conveniently apply bait to the fish hook, or a fly to the line while holding the pole free of the water when the fisherman is wading, or free of ground entanglement when fishing from the shore. And when the pole or rod is placed in the socket to allow the fisherman to use both hands in attaching flies or other fish lure to the hook.

The socket is particularly adapted for use of trout fly pole, casting pole or steelhead pole, and is adapted to fit any single action fly reel or casting reel. When the reel is attached at or near the butt of the handle of the pole, the reel will not interfere with the placing of the pole in the socket.

A further object of the invention is the provision of means by which the fishing pole support may be conveniently and removably suspended from the belt or trouser band of the fisherman.

A further object of the invention is the provision of a bait can or like receptacle carried by and removable with respect to the support, and adapted to be held in a position accessible to the fisherman, or folded into compact relation with the support proper when the device is not in use.

The invention is illustrated in the accompanying drawings, in which

Figure 1 is a view in side elevation of the fishing pole support, showing the bait receptacle in operative position, and the support suspended from the waistband of the user.

Figure 2 is a front elevation of the fishing pole support and bait receptacle with the latter in operative position.

Figure 3 is a top plan view of the device, the parts being shown in the positions illustrated in Figure 2.

Figure 4 is a perspective view of the wire structure of the improvement.

The improved fishing pole support comprises a main plate 3 of appropriate height and width, the side edges of which are formed in return loops 10 and which side edges of the plate 3 are preferably downwardly convergent, as shown more particularly in Figure 2.

Riveted or otherwise secured to the longitudinal center of the plate 3 is a clamp member 2. The side edges of the clamp member which are upwardly convergent are substantially the full length of the plate 3, and formed as outwardly flaring return loops 2' to facilitate the introduction and removal of the fishing pole. The lower portion of the plate of the clamp is projected forwardly at right angles to the plate 3, with its forward edge upturned to provide a socket 1 to receive the butt of the fishing pole, thus supporting the pole within the clamp. A spring 8 embraces the side walls of the clamp and yieldingly supports the forward edges 2 in their minimum spaced relation under normal conditions. The spring 8 yields under pressure between the rounded forward edges of the clamp to permit the introduction and removal of the fishing pole when desired.

The rounded loop ends 10 of the plate 3 are each provided with a loose wire length which at the lower end is formed as an eye 7 and at the upper end is extended inwardly and then rearwardly, as at 9, the portion intermediate the rearward extension forming a bar 9' for a purpose which will later appear. Of course, the wire length described is of a single length of wire having its terminals formed to provide the eye 7 at the lower end of the plate 3, and the intermediate portion formed as described at the upper end of the plate 3.

The bait receptacle is indicated at 5, and constitutes a box-like element open at the top which may be used for any desired purpose by the fisherman. This plate receptacle is supported by the wire length indicated at 5', the upper end of which is coiled at 11 over the inward extension of the formation 9 of the wire length previously described, with such wire 5' extending lengthwise of the loop formation 10 at one side, and passes at its lower end through the lower eye 7 of the previously described supporting wire at that end.

The wire 5' below the eye 7 is then bent laterally toward the forward plane of the support, then downwardly, forwardly, laterally, rearwardly and upwardly to more or less snugly receive and support the bait receptacle 5—these various formations and arrangements of this wire end being as indicated at 4, and shown more particularly in Figure 2 of the drawings. The end of the final upward portion of the wire is then projected transverse and through the walls of the receptacle 5, terminating in a projection 4' which extends beyond the first downwardly extended receptacle embracing portion of the wire. This element or wire portion which extends through the receptacle serves as a pivot for the receptacle on which the latter may be swung upwardly or downwardly, it being apparent that when swung downwardly the underlying portion of the wire beneath the bottom of the receptacle which is in advance of the pivot will support the receptacle in substantially horizontal position.

In order that the parts may be arranged in a more compact relation when not in use, and also to provide an arrangement where the bait receptacle may be out of the way when not required without interfering with the use of the fishing pole support, the bait receptacle 5 may obviously swing upwardly on its pivot and positioned alongside and in substantial contact with the adjacent edge of the plate 3. In this position, which is shown in dotted lines in Figure 1, the bait receptacle is substantially in the same vertical plane as the fishing pole support, and is obviously a more compact assembly of the parts when the contents of the bait receptacle are not desired for use.

A spring clip 15 is connected at an appropriate point near the upper end of the wire 5', beneath which the free end of the receptacle 5 may be secured to hold this receptacle in inoperative relation and in close cooperation with the plate 3, all as indicated in dotted lines in Figure 1.

The cross bar 9' at the upper end of the wire support of the plate is provided with an element whereby the device as a whole may be supported from the belt or trouser band indicated at 16 in Figure 1. This element includes a wire 6 terminally formed with eyes to encircle the supporting bar 9', then projected upwardly and then formed in a return bend to present downwardly extending legs and connected cross bar to bear on the inside of the belt or garment band. The upwardly extending portion is preferably provided with a loop 6' to serve as a spring means for frictional engagement with the belt or trouser band.

In the use of the device, the fishing pole indicated at 13 will be positioned with its butt in the pocket or support 1 and the upper portion of the handle, above the butt end in the clamp 2. In this position, the fishing pole will be held in an upright manner, leaving the line free to be handled or baited by the user, while preventing the line from being caught in the water or in the underbrush in the different fishing positions. As indicated in the additional dotted position of the fishing pole, the latter may be swung partly out of the clamp, and still held in at least a temporary holding position for fishing purposes, or such fishing pole may be obviously entirely removed when desired.

The bait receptacle 5 may be readily swung down and supported in a position slightly below and at one side of the plate 3, or it may be swung up to a position adjacent and in substantially the same vertical plane as the plate.

It will be obvious, of course, that the various parts of the structure may be made up of appropriate material, with the essential requisite that such material is preferably as light as possible, consistent with the desired strength.

Obviously the rod may be held in the clamp in a position to avoid any interference by the reel, indicated in dotted lines at 14 in Figure 1.

What is claimed as new is:

1. A fishing accessory including a plate, means for supporting the plate from the person of the user, a bait receptacle and a wire-like element for supporting the bait receptacle, said element being constructed of a single length of wire and formed to provide an upstanding length, side portions extending along the sides of the bait receptacle when the latter is in operative position, a transverse length between the side portions to underlie and support the bait receptacle when in said position, and a terminal portion extending through the bait receptacle to provide a horizontal pivot about which the receptacle may swing to inoperative position, said upstanding length being swingingly supported in the plate.

2. A combined fishing pole support and bait receptacle carrier, including a plate, means for supporting the plate from the person of the user, a fishing-rod clamping means carried by the plate, a bait receptacle, and means carried by the plate for swingingly supporting the bait receptacle, said supporting means including a rod on which the bait receptacle is swingingly supported, and an element cooperating with said rod to hold the bait receptacle in a predetermined operative position, said supporting means permitting movement of the bait receptacle from an operative position at substantially right angles to and at one side of the plate to an inoperative position adjacent and in substantially the same vertical plane as the plate.

3. A construction as defined in claim 2, wherein wire lengths are mounted in the side edges of the plate and terminate in loop formation immediately above and below the plate, and wherein the bait supporting means includes an upright mounted in the loops of one of said wire lengths.

STEPHEN MAYER.